(No Model.)

R. SOLANO.
CABLE RAILWAY.

No. 331,838. Patented Dec. 8, 1885.

WITNESSES:
Gunwald Aas
John G. Honey

INVENTOR
Renaldo Solano
BY James A. Whitney
ATTORNEY

UNITED STATES PATENT OFFICE.

RENALDO SOLANO, OF BROOKLYN, NEW YORK.

CABLE RAILWAY.

SPECIFICATION forming part of Letters Patent No. 331,833, dated December 8, 1885.

Application filed July 15, 1885. Serial No. 171,675. (No model.)

*To all whom it may concern:*

Be it known that I, RENALDO SOLANO, of Brooklyn, in the county of Kings and State of New York, have invented an Improvement in Cable Railways, of which the following is a specification.

The object of this invention is to provide means whereby cars on "cable railways," so called, may be switched from one track to another without injury to the sides of the opening through which the vehicle is connected with the cable, and whereby any interference with the cable itself during the switching of the car or vehicle is obviated.

My invention comprises certain novel combinations of parts whereby the aforesaid object is effectually secured.

Figure 1:
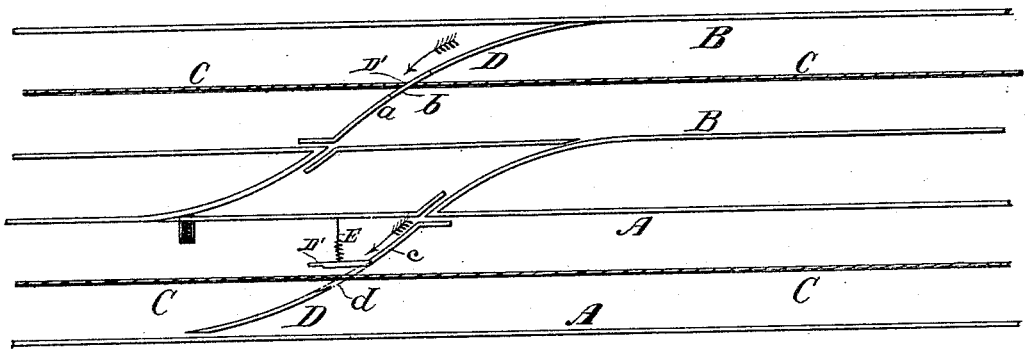
Figure 2:
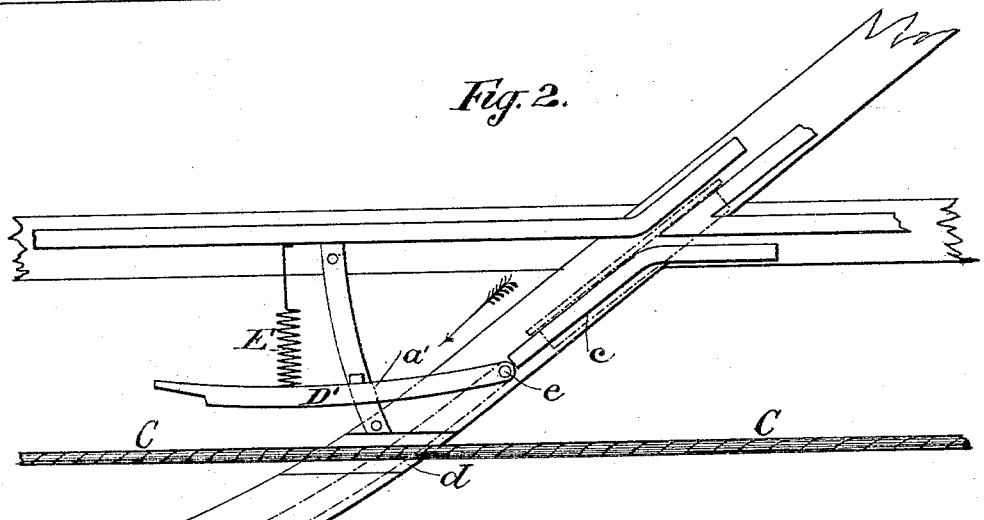
Figure 3:
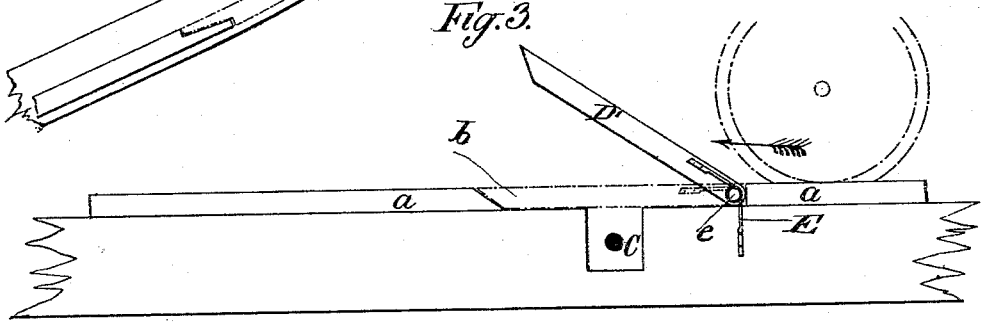

Figure 1 is a plan view illustrating my said invention. Fig. 2 is also a plan view, but on a larger scale, and more clearly representing the details of my said invention. Fig. 3 is an elevation of a side view illustrating a modified construction of my said invention.

A and B are two tracks of a cable road, each provided with its own cable C in the usual or any suitable manner. D is a switch designed for running the cars or vehicles from one track to another, and which, so far as concerns the guidance of the wheels of the cars or vehicles, may be of any suitable or approved construction.

Inasmuch as the cars or vehicles, the means of operating, driving, and guiding the cable C, and the means of connecting and disconnecting the cars or vehicles with said cables may be of any of the usual or of any suitable construction, it is not necessary to here describe the said parts in detail, their selection, arrangement, and construction being a matter of mechanical judgment and selection. The switch D need not differ substantially from those heretofore in use in connection with railway-tracks; but through the one rail *a* thereof is an opening, *b*, to permit the passage along the straight track B of its cable C, and also to permit the operation of said cable in the usual manner in propelling the car along the said straight track B. The opposite rail, *c*, of said switch is in like manner provided with a substantial like opening, *d*, to permit the passage and operation in like manner of the cable C of the other straight track, A. These openings *b d* are necessary in a switch used in connection with duplicate tracks A and B, each provided with its own cable, for these openings are necessarily opened or unclosed when the cars or vehicles run upon the straight tracks; but if open or unclosed when the car or vehicle passes upon the rails *a c* of the switch the rails at the ends of said openings are liable to become battered, and the cable itself is liable to serious injury by the passage of the wheels over said openings and contiguous to said cables. To remedy this serious drawback to the operation of switches on cable roads, I provide a device or devices for temporarily closing the openings *b d* while the wheels of the car or vehicle are passing above them.

The preferred forms or constructions of my said invention are more fully shown in Figs. 2 and 3.

Having reference to Figs. 1 and 2, the switch is arranged to receive the car or vehicle running in the desired direction, as indicated, for example, by arrows in said Figs. 1 and 2.

At that end of each of the openings *b* and *d* nearest approaching car or vehicle is pivoted, as shown at *e*, a bar or plate, D', in such relation that the same may be turned upon its pivots *e* and brought over and across the adjacent opening *b* or *d*, as the case may be, so as to form a bridge over such opening, and above the cable C, whereon the adjacent wheels of the vehicle may pass to the opposite part of the rail. A spring, E, of any suitable construction, is arranged to hold the bar or plate D' away from the adjacent opening, as represented in Figs. 1 and 2, except when power is applied to bring and retain said bar over said opening, as hereinbefore explained. When the wheels of the car approach in the direction indicated by the arrows in Figs. 1 and 2, the flange of the wheel striking the inner side, *a'*, of the bar or plate D', crouches or presses the same into a position parallel with the rail to which it is pivoted, as hereinbefore explained, thereby causing said bar or plate D' to bridge the adjacent opening, as hereinbefore explained, and affording a support to the wheels of the car or vehicle while crossing the said opening, and as a result protecting the sides or edges of the opening and the cable from injury.

In the modification shown in Fig. 3 the bridge or bar D', instead of being placed upon a vertical pivot and arranged to have a substantial horizontal movement, is pivoted upon a horizontal pivot, also indicated by the reference-letter $e$, and is provided with a spring, which, as in Figs. 1 and 2, is indicated by reference letter E, but, as represented in Fig. 3, arranged to lift the bar or plate D' around its pivot $e$, to elevate the same to open or unclose the opening to permit the operation of the cable C, as hereinbefore explained. With this construction of the apparatus the wheel of the car or vehicle passes upon the plate or bar D', and presses the same downward over the opening, something after the fashion of a drop or draw bridge, thereby insuring the same result as with the construction first herein described—namely, that of permitting the wheels to pass over the opening without injury to the sides of the opening or to the cable.

I do not confine myself to the precise construction of devices herein set forth, inasmuch as various modifications may be employed with more or less advantage and embracing my said invention, and I have here described those which I prefer, and which I believe to be practically the most advantageous.

What I claim as my invention is—

1. The combination, with the tracks of a cable railroad adjacent to and connected with a switch therein, of movable bars, plates, or devices arranged to cover the openings in the rails where intersected by the slot of the tube during the passage of the wheels of a car or vehicle upon said rails, substantially as and for the purpose herein set forth.

2. The combination, with the switch, the tracks, and cables of a cable railroad, of a pivot bar, plate, or device arranged to swing and to be swung from the openings of the switch-rails at the intersection of the slot therewith during the normal use of one or the other of said tracks, and to swing over the said openings during the transit of a car or vehicle over the said rails from one track to another, substantially as and for the purpose herein set forth.

3. The combination, with the switch, the tracks, and cables of a cable railroad, of a movable bar, plate, or device arranged to be moved over the opening in the rails by the action of a passing car or vehicle, and a spring or equivalent device for moving said movable bar, plate, or device away from said opening when the bar, plate, or device is released from the action of the vehicle, substantially as and for the purpose herein set forth.

RENALDO SOLANO.

Witnesses:
JOHN G. HONEY,
GUNVALD AAS.